United States Patent
Masurekar et al.

(10) Patent No.: US 10,484,515 B2
(45) Date of Patent: Nov. 19, 2019

(54) IMPLEMENTING LOGICAL METADATA PROXY SERVERS IN LOGICAL NETWORKS

(71) Applicant: Nicira, Inc., Palo Alto, CA (US)

(72) Inventors: Uday Masurekar, Sunnyvale, CA (US);
Jayant Jain, Palo Alto, CA (US);
Ronghua Zhang, San Jose, CA (US);
Mani Kancherla, Cupertino, CA (US);
Minjal Agarwal, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 265 days.

(21) Appl. No.: 15/420,059

(22) Filed: Jan. 30, 2017

(65) Prior Publication Data
US 2017/0317974 A1 Nov. 2, 2017

Related U.S. Application Data

(60) Provisional application No. 62/329,956, filed on Apr. 29, 2016.

(51) Int. Cl.
*H04L 29/06* (2006.01)
*H04L 29/08* (2006.01)
*H04L 29/12* (2006.01)

(52) U.S. Cl.
CPC .......... *H04L 69/22* (2013.01); *H04L 61/2015* (2013.01); *H04L 61/6063* (2013.01); *H04L 69/325* (2013.01); *H04L 69/326* (2013.01)

(58) Field of Classification Search
None
See application file for complete search history.

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

| CN | 101677291 A | 3/2010 |
| EP | 1653688 A1 | 5/2006 |

(Continued)

OTHER PUBLICATIONS

Author Unknown, "What is a Logical Network?," Feb. 2010, 3 pages, retrieved from https://searchnetworking.techtarget.com/definition/logical-network.

(Continued)

*Primary Examiner* — Gregory B Sefcheck
*Assistant Examiner* — Jenkey Van
(74) *Attorney, Agent, or Firm* — Adeli LLP

(57) ABSTRACT

Some embodiments provide a method for providing metadata proxy services to different data compute nodes that are associated with different logical networks (e.g., for different tenants of a datacenter). When a data compute node (DCN) is instantiated (i.e., starts executing) in a host machine, the DCN requests for metadata associated with the DCN from a metadata server. The requested metadata includes identification and configuration data (e.g., name and description, amount of virtual memory, number of allocated virtual CPUs, etc.) for the DCN. Each DCN generates and sends out a metadata request packet after an IP address is assigned to the DCN (e.g., by a DHCP server). In some embodiments, a metadata proxy server (1) receives the metadata request packets that are sent by different DCNs associated with different logical networks, (2) adds logical network identification data to the packets, and (3) forwards the packets to a metadata server.

20 Claims, 7 Drawing Sheets

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,205,118 B1 | 3/2001 | Rathnavelu |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,152,117 B1 | 12/2006 | Stapp et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,231,660 B1 | 6/2007 | Daude et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,542,468 B1 | 6/2009 | Begley et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,814,541 B1 * | 10/2010 | Manvi ............... H04L 12/4645 713/154 |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,882,169 B1 | 2/2011 | Droms et al. |
| 7,885,276 B1 | 2/2011 | Lin |
| 7,890,689 B2 | 2/2011 | Lam et al. |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,176,094 B2 | 5/2012 | Friedman |
| 8,190,767 B1 | 5/2012 | Maufer et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,549 B2 | 8/2012 | Aura et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Sakai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,958,298 B2 | 2/2015 | Zhang et al. |
| 9,043,463 B1 | 5/2015 | Cohn et al. |
| 9,059,999 B2 | 6/2015 | Koponen et al. |
| 9,887,960 B2 | 2/2018 | Chanda et al. |
| 9,952,885 B2 | 4/2018 | Chanda et al. |
| 9,999,030 B2 | 6/2018 | Gu et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0093481 A1 | 5/2003 | Mitchell et al. |
| 2003/0163341 A1 | 8/2003 | Banerjee |
| 2004/0021678 A1 | 2/2004 | Ullah et al. |
| 2004/0073659 A1 | 4/2004 | Rajsic et al. |
| 2004/0078419 A1 * | 4/2004 | Ferrari ............... H04L 29/06 709/201 |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0080891 A1 | 4/2005 | Cauthron |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0188063 A1 | 8/2005 | Finley et al. |
| 2005/0251856 A1 | 11/2005 | Araujo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari |
| 2006/0092976 A1 | 5/2006 | Lakshman et al. |
| 2006/0161663 A1 | 7/2006 | Palm |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0043860 A1 | 2/2007 | Pabari |
| 2007/0061492 A1 | 3/2007 | Riel |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0286209 A1 | 12/2007 | Wang et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0072305 A1 | 3/2008 | Casado et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |

(56) References Cited

U.S. PATENT DOCUMENTS

| | | |
|---|---|---|
| 2008/0253366 A1 | 10/2008 | Zuk et al. |
| 2008/0291910 A1 | 11/2008 | Tadimeti et al. |
| 2009/0019536 A1 | 1/2009 | Green et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0132696 A1 | 5/2009 | Cankaya et al. |
| 2009/0150527 A1 | 6/2009 | Tripathi et al. |
| 2009/0161547 A1 | 6/2009 | Riddle et al. |
| 2009/0177953 A1 | 7/2009 | Cau |
| 2009/0235325 A1 | 9/2009 | Dimitrakos et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0282471 A1* | 11/2009 | Green .................. H04L 63/029 726/12 |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0299419 A1 | 11/2010 | Ramankutty et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0030032 A1 | 2/2011 | Baykal et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0082879 A1* | 4/2011 | Hazlewood ......... G06F 16/9027 707/770 |
| 2011/0085557 A1 | 4/2011 | Gnanasekaran et al. |
| 2011/0085559 A1 | 4/2011 | Chung et al. |
| 2011/0119382 A1 | 5/2011 | Shaw, Jr. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0027008 A1* | 2/2012 | Chou .................... H04L 45/00 370/352 |
| 2012/0131643 A1 | 5/2012 | Cheriton |
| 2012/0131662 A1 | 5/2012 | Kuik |
| 2012/0182992 A1 | 7/2012 | Cowart et al. |
| 2012/0197973 A1 | 8/2012 | Tukol et al. |
| 2012/0236734 A1 | 9/2012 | Sampath et al. |
| 2012/0281711 A1 | 11/2012 | Karaoguz et al. |
| 2013/0007740 A1 | 1/2013 | Kikuchi et al. |
| 2013/0041987 A1 | 2/2013 | Warno |
| 2013/0044636 A1 | 2/2013 | Koponen et al. |
| 2013/0044641 A1 | 2/2013 | Koponen et al. |
| 2013/0058229 A1 | 3/2013 | Casado et al. |
| 2013/0058346 A1* | 3/2013 | Sridharan ............. H04L 45/586 370/392 |
| 2013/0058351 A1 | 3/2013 | Casado et al. |
| 2013/0073743 A1 | 3/2013 | Ramasamy et al. |
| 2013/0128891 A1* | 5/2013 | Koponen ............. H04L 41/0823 370/392 |
| 2013/0142048 A1 | 6/2013 | Gross, IV et al. |
| 2013/0148505 A1* | 6/2013 | Koponen ................ H04L 47/12 370/235 |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0227550 A1 | 8/2013 | Weinstein et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0294230 A1 | 11/2013 | Popa et al. |
| 2013/0329548 A1 | 12/2013 | Nakil et al. |
| 2013/0332983 A1 | 12/2013 | Koorevaar et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0068602 A1 | 3/2014 | Gember |
| 2014/0075013 A1* | 3/2014 | Agrawal ............. G06F 11/3495 709/224 |
| 2014/0115578 A1 | 4/2014 | Cooper et al. |
| 2014/0195666 A1 | 7/2014 | Dumitriu et al. |
| 2015/0016469 A1* | 1/2015 | Ganichev ................ H04L 49/90 370/429 |
| 2015/0052262 A1 | 2/2015 | Chanda et al. |
| 2015/0052522 A1 | 2/2015 | Chanda et al. |
| 2015/0095472 A1 | 4/2015 | Cardona et al. |
| 2015/0103838 A1* | 4/2015 | Zhang ..................... H04L 45/04 370/401 |
| 2015/0117445 A1* | 4/2015 | Koponen ............. H04L 41/0896 370/389 |
| 2015/0124823 A1 | 5/2015 | Pani et al. |
| 2015/0163196 A1 | 6/2015 | Bhagwat et al. |
| 2015/0381478 A1* | 12/2015 | Zhang .................. H04L 45/306 370/392 |
| 2016/0248729 A1 | 8/2016 | Cui |
| 2016/0352867 A1* | 12/2016 | Subbarayan ............. H04L 69/16 |
| 2017/0317969 A1 | 11/2017 | Masurekar et al. |
| 2018/0159821 A1 | 6/2018 | Chanda et al. |

FOREIGN PATENT DOCUMENTS

| | | |
|---|---|---|
| JP | 2003069609 A | 3/2003 |
| JP | 2003124976 A | 4/2003 |
| JP | 2003318949 A | 11/2003 |
| WO | 2005112390 A1 | 11/2005 |
| WO | 2008095010 A1 | 8/2008 |

OTHER PUBLICATIONS

Cain, Nigel, "System Center: Virtual Machine Manager Engineering Blog. Networking in VMM 2012 SP1-Logical Networks (Part I)," Feb. 14, 2013, 24 pages, Retrieved from: https://blogs.technet.microsoft.com/scvmm/2013/02/14/networking-in-vmm-2012-sp1-logical-networks-part-i/.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

(56) References Cited

OTHER PUBLICATIONS

Kim, Changhoon, et al., "Floodless in SEATTLE: A Scalable Ethernet Architecture for Large Enterprises," SIGCOMM'08, Aug. 17-22, 2008, 12 pages, ACM, Seattle, Washington, USA.

\* cited by examiner

US 10,484,515 B2

IMPLEMENTING LOGICAL METADATA PROXY SERVERS IN LOGICAL NETWORKS

BACKGROUND

Metadata for a virtual machine (VM) contains information such as the name, description, and configuration data for the VM. When a VM is created/instantiated on a host machine, the VM requests for metadata associated with the VM from a metadata server (often through a metadata proxy server). With the number of virtual machines that may operate in a multi-tenant data center, each tenant's network topology may include several different subnets with different IP address ranges assigned to these subnets. As such, two or more subnets (belonging to different tenants) may share the same or overlapping IP address ranges. Typically, in order to provide metadata proxy services for different logical networks that have subnets with overlapping IP address ranges, a network has to deploy multiple metadata proxy servers that are isolated from each other. As such, a large network that implements thousands of logical networks would require thousands of isolated metadata proxy servers.

BRIEF SUMMARY

Some embodiments provide a method for providing metadata proxy services to different data compute nodes that are associated with different logical networks (e.g., for different tenants of a datacenter). When a data compute node (DCN) is instantiated (i.e., starts executing) in a host machine, the DCN requests for metadata associated with the DCN from a metadata server. The requested metadata includes identification and configuration data (e.g., name and description, amount of virtual memory, number of allocated virtual CPUs, etc.) for the DCN. In some embodiments, the DCN generates and sends out a metadata request packet (e.g., an HTTP packet) after an IP address is assigned to the DCN (e.g., by a DHCP server). In some embodiments, a metadata proxy server (1) receives the metadata request packets that are sent by different DCNs associated with different logical networks, (2) adds logical network identification data to the packets, and (3) forwards the packets to a metadata server.

The metadata request packets that are received from different logical networks contain an L3 (e.g., IP layer) destination that identifies the metadata proxy (MDP) server, and a particular L4 (e.g., TCP layer) destination port number to which the MDP server listens (e.g., port 80). In order to distinguish between the metadata request packets that are received from different logical networks, some embodiments implement an MDP server module with several ports, each of which provides MDP service for a particular logical network (e.g., for a particular logical switch of a logical network). The method receives a metadata request packet from a DCN that is logically coupled to a logical forwarding element (e.g., a logical L2 switch). In some embodiments, the method replaces the L4 destination port of the packet received from the logical forwarding element (LFE) with a port number of the MDP server module that provides MDP service for the LFE (e.g., the logical switch from which the packet is received), before sending the packet to the MDP server module.

The MDP server module, in some embodiments, is a namespace that includes several ports (e.g., TCP ports) and several MDP instances. In some embodiments a namespace is a lightweight container (less computationally intensive than a virtual machine) that can operate on a physical machine and that can execute various processes. Each port of the MDP server module is dedicated to a particular LFE of a logical network (or to a particular logical network) in some embodiments. Each metadata proxy instance of the MDP server module is a process that listens to a particular port of the MDP server module in order to provide MDP service to the LFE (or logical network) associated with that particular port.

After identifying the logical forwarding element (or logical network) from which a metadata request packet is received, the MDP server module of some embodiments adds the logical network identification data to the packet (e.g., to a payload of the packet, to one or more packet headers, etc.) and forwards the packet to a metadata server (e.g., a Nova server). The metadata server of some embodiments contains the required metadata for the DCNs of different logical networks.

The metadata server of some embodiments retrieves the metadata for the requesting DCN based on the identification data in the packet (e.g., logical switch's ID and source IP address). In some embodiments, the metadata server employs services of another server (e.g., Neutron server) to receive more identification information (e.g., logical network's ID and tenant's ID) for the requesting DCN. The metadata server retrieves the requested metadata for the DCN based on the additional identification information. The metadata server then returns the requested metadata to the MDP module, which in turn returns the metadata to the requesting DCN. In some embodiments, the metadata server is not on the same physical network that implements the logical networks, while in other embodiments this server is a part of the same physical network.

In some embodiments, a set of managed forwarding elements (MFEs) that implements the different logical networks (i.e., implements different logical network elements such as L2 and L3 logical forwarding elements) modifies a metadata request packet's headers before forwarding the packet to the MDP server module. That is, after identifying a received packet as a metadata request packet, the set of MFEs (e.g., a particular MFE in the set) substitutes the L4 destination port of the packet with a new destination port number that is associated with the logical network from which the packet is received.

Since the MFEs of some embodiments implement the logical forwarding elements (e.g., executes the pipelines of the logical forwarding elements), the set of MFEs could identify the logical forwarding element from which the packet is received. The set of MFEs of some embodiments uses a mapping table to map an identified LFE to an L4 destination port that provides metadata proxy service for that LFE and then forwards the packet to the MDP server module (i.e., to the mapped port of the module). In some embodiments, the set of MFEs also establishes a dataflow and creates a flow entry for the metadata request packet in its dataflow table (since the metadata request packet is a TCP packet), once the set of MFEs receives the packet. This way, when a response packet is received back from the metadata server, the set of MFEs knows which logical switch and network has originated the request and sends the response back to the requesting DCN accordingly (i.e., send the response back to the set of MFEs that implements the logical switch to which the DCN is logically connected).

In some embodiments, the set of MFEs that updates the L4 destination ports of the metadata request packets executes on an edge node of a physical network infrastructure (e.g., a datacenter) over which the logical networks are implemented. The set of MFEs, in some embodiments, also implements a virtual tunnel endpoint (VTEP) which exchanges network data with other MFEs that execute on other host machines and/or edge nodes. In some embodiments, the edge node (e.g., a gateway machine) is one of several edge nodes of an edge cluster that connects a logical network to other logical networks implemented by the same physical network, or to other external networks (e.g., external logical and/or physical networks).

A user (e.g., a tenant of a hosting system) specifies a logical network topology by defining different logical elements of the logical network (e.g., logical switches, routers, metadata servers, etc.) for a management plane (e.g., a manager machine or application in a management cluster). The user defines the logical network elements through a set of application programming interface (API) calls. The management plane, based on the received logical network definition, generates the necessary configuration data for the logical elements and pushes this configuration data to one or more controllers in a central control plane (CCP) cluster of the network. Based on the generated configuration data, the control plane configures the logical elements on a set of physical nodes (e.g., host machines, gateway machines, etc.) that implements the logical network.

One of the logical elements that a user may define for the logical network topology is a logical MDP server that provides metadata proxy service for every data compute node (e.g., a virtual machine, a container, a namespace, etc.) that is connected to a logical forwarding element (e.g., a logical switch). In some embodiments, when the user defines a logical MDP server for a logical switch, the management plane automatically generates a logical MDP port on the logical switch for the logical MDP server. The management plane then assigns unique IP and MAC addresses to the logical MDP port in order to couple the logical MDP port to a physical MDP server module that executes on an edge node. In some embodiments, each set of defined logical MDP servers gets mapped to a physical MDP server operating in an edge node of an edge cluster in order to enable scalability.

The logical MDP port's IP address, in some embodiments, is a unique metadata proxy IP address (e.g., 169.254.169.254) that is associated with the MDP server module. However, a DCN that initiates a metadata request packet does not have this IP address when the DCN is instantiated (e.g., in a host machine). In some embodiments, when a DHCP server is present and provides DHCP services for the logical switch to which the DCN is coupled, the DHCP server adds the metadata proxy IP address to the routing table of the DNC. That is, when the DCN sends a request for an IP address (to be assigned to the DCN) to the DHCP server, the DHCP server returns both an IP address for the DCN and a unique metadata proxy IP address to the DCN (e.g., through DHCP option 121).

In some embodiments, when a DHCP server is not available, a user may manually add the IP address as a static route to the routing table of the DCN. This way, the DCN can generate and send out the metadata request packet with a destination IP address of the logical MDP server (which is also associated with the MDP server module).

In some embodiments, the management plane (a manager in a management plane cluster) selects two edge nodes from the edge cluster (or two host machines from the physical nodes of the network) to implement the MDP server module. In some such embodiments, the first edge node implements a master (or active) MDP server and the second edge node implements a backup (or standby) MDP server. Thus, a particular one of the MDP server modules is an active MDP server that includes a set of L4 ports for a particular set of logical MDP servers, while the other MDP server module is a standby MDP server that includes the same set of L4 ports for the same particular set of logical MDP servers in case a failover process is activated. When the logical MDP server is implemented on two different MDP server modules (that operate on two different edge nodes) with active-standby implementation, a managed forwarding element at the DCN's host machine sends the metadata request packet to only the active MDP server module (e.g., via a tunnel between the host machine and the edge node) in some embodiments.

In some embodiments a user (e.g., a datacenter network administrator) specifies, through the management plane, which edge nodes of the edge cluster should implement the MDP server modules (e.g., the active and standby modules). In some embodiments, if a user does not assign the edge nodes, the management plane of the network automatically creates the MDP modules on available edge nodes in the edge cluster. In some embodiments the management plane automatically assigns the edge nodes upon receiving a definition of a new logical MDP server that has to be implemented by a MDP server module. In some other embodiments, the management plane assigns the edge nodes at boot time of the edge cluster of the network.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
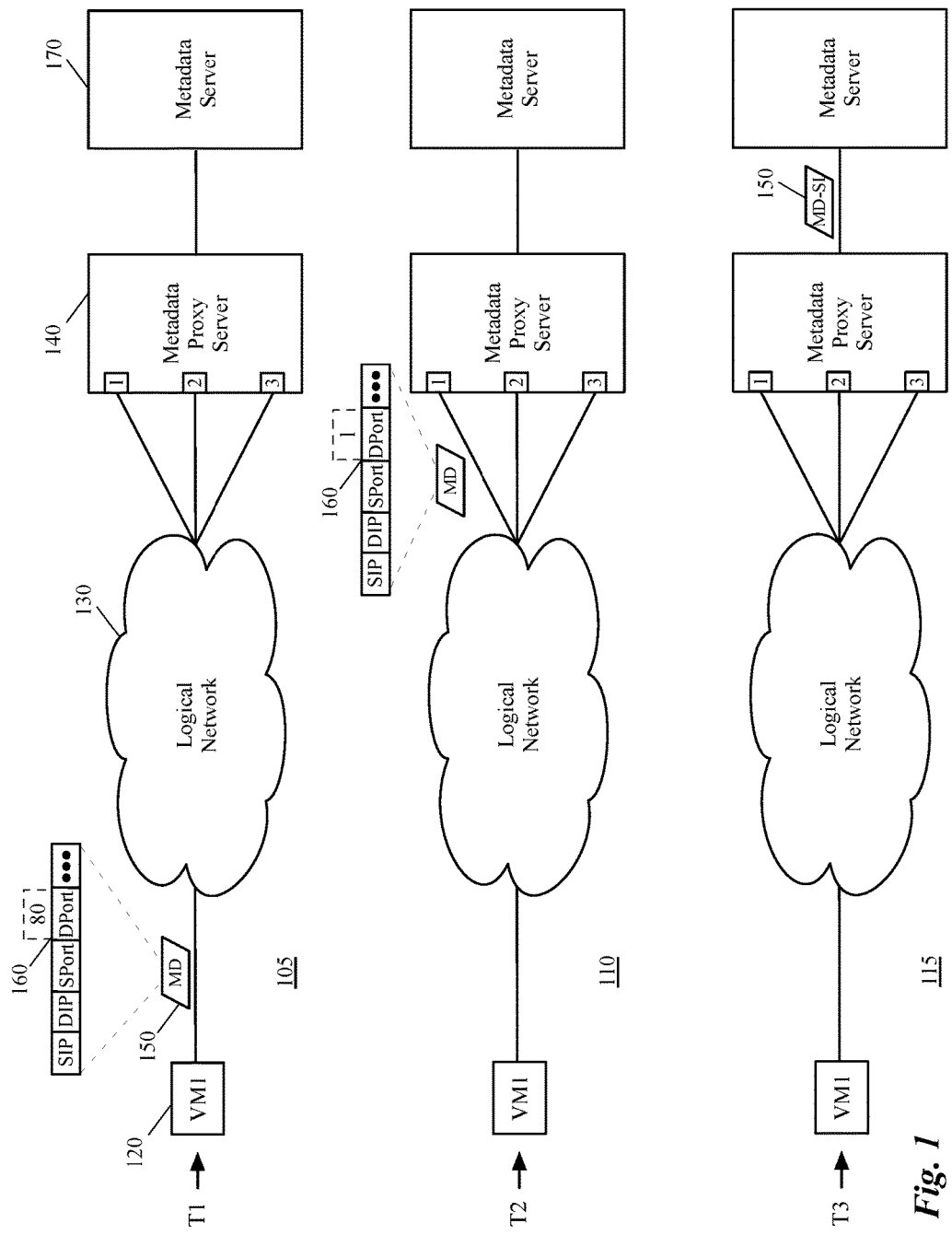
FIG. 1 illustrates an example of modifying packet header data in a metadata request packet before sending the packet to a metadata proxy server to enable the server to identify a logical network from which the packet is received.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for providing metadata proxy services to different data compute nodes that are associated with different logical networks (e.g., for different tenants of a datacenter). When a data compute node (DCN) is instantiated (i.e., starts executing) in a host machine, the DCN requests for metadata associated with the DCN from a metadata server. The requested metadata includes identification and configuration data (e.g., name and description, amount of virtual memory, number of allocated virtual CPUs, etc.) for the DCN. In some embodiments, the DCN generates and sends out a metadata request packet (e.g., an HTTP packet) after an IP address is assigned to the DCN (e.g., by a DHCP server). In some embodiments, a metadata proxy server (1) receives the metadata request packets that are sent by different DCNs associated with different logical networks, (2) adds logical network identification data to the packets, and (3) forwards the packets to a metadata server.

The metadata request packets that are received from different logical networks contain an L3 (e.g., IP layer) destination that identifies the metadata proxy (MDP) server, and a particular L4 (e.g., TCP layer) destination port number to which the MDP server listens (e.g., port 80). In order to distinguish between the metadata request packets that are received from different logical networks, some embodiments implement an MDP server module with several ports, each of which provides MDP service for a particular logical network (e.g., for a particular logical switch of a logical network). The method receives a metadata request packet from a DCN that is logically coupled to a logical forwarding element (e.g., a logical L2 switch). In some embodiments, the method replaces the L4 destination port of the packet received from the logical forwarding element (LFE) with a port number of the MDP server module that provides MDP service for the LFE (e.g., the logical switch from which the packet is received), before sending the packet to the MDP server module.

In some embodiments, a set of managed forwarding elements (MFEs) that implements the different logical networks (i.e., implements different logical network elements such as L2 and L3 logical forwarding elements) modifies a metadata request packet's headers before forwarding the packet to the MDP server module. That is, after identifying a received packet as a metadata request packet, the set of MFEs (e.g., a particular MFE in the set) substitutes the L4 destination port of the packet with a new destination port number that is associated with the logical network from which the packet is received.

Since the MFEs of some embodiments implement the logical forwarding elements (e.g., executes the pipelines of the logical forwarding elements), the set of MFEs could identify the logical forwarding element from which the packet is received. The set of MFEs of some embodiments uses a mapping table to map an identified LFE to an L4 destination port that provides metadata proxy service for that LFE and then forwards the packet to the MDP server module (i.e., to the mapped port of the module). In some embodiments, the set of MFEs also establishes a dataflow and creates a flow entry for the metadata request packet in its dataflow table (since the metadata request packet is a TCP packet), once the set of MFEs receives the packet. This way, when a response packet is received back from the metadata server, the set of MFEs knows which logical switch and network has originated the request and sends the response back to the requesting DCN accordingly (i.e., send the response back to the set of MFEs that implements the logical switch to which the DCN is logically connected).

In some embodiments, the set of MFEs that updates the L4 destination ports of the metadata request packets executes on an edge node of a physical network infrastructure (e.g., a datacenter) over which the logical networks are implemented. The set of MFEs, in some embodiments, also implements a virtual tunnel endpoint (VTEP) which exchanges network data with other MFEs that execute on other host machines and/or edge nodes. In some embodiments, the edge node (e.g., a gateway machine) is one of several edge nodes of an edge cluster that connects a logical network to other logical networks implemented by the same physical network, or to other external networks (e.g., external logical and/or physical networks).

FIG. 1 illustrates an example of modifying packet header data in a metadata request packet before sending the packet to a metadata proxy server to enable the server to identify a logical network from which the packet is received. More specifically, the figure shows, in three different stages 105-115, which represent three consecutive points of time T1-T3, how an L4 destination port (e.g., TCP destination port) number of a metadata request packet initiated by a DCN is replaced by a port number that is associated with a logical switch from which the packet is received. The packet header is modified after the packet is forwarded by a virtual machine (VM1) that is logically connected to a logical network and before the packet is received by an MDP server. The metadata request is for providing identifying and configuration data for the VM after the VM is created in a host machine. The figure includes a VM 120, a logical network 130, an MDP server module 140, and a metadata server 170.

In some embodiments, the VM 120 is a virtual machine that executes on a host machine (e.g., of a hosting system such as a datacenter). The VM is logically coupled to a logical network 130 (e.g., through a logical switch of the network) that connects the VM to other VMs of a tenant of the hosting system. The other VMs may execute on the same host machine as the VM or other host machines of the hosting system. The logical network also connects the VMs of the tenant to other logical networks implemented by the same hosting system, or other physical and/or logical networks outside the hosting system (e.g., other logical networks that are implemented by other hosting systems or any other type of physical network).

The MDP server module 140 is a namespace that is created on an edge node (e.g., of the datacenter) and includes several ports (e.g., TCP ports) and several MDP instances in some embodiments. As illustrated in the figure, the MDP server module 140 has three TCP ports (i.e., ports 1-3). A namespace, in some embodiments, is a lightweight container (e.g., less computationally intensive than a virtual machine) that can operate on a physical machine and that can execute various processes. Each port of the MDP server module is dedicated to a particular logical forwarding element (LFE) of a logical network (or a particular logical network). Each metadata proxy instance of the MDP server module is a process that listens to a particular port of the MDP server module in order to provide MDP service to the LFE (e.g., a logical switch) associated with that particular port.

The MDP server module 140 of some embodiments is connected to a metadata server 170 that ultimately provides the requested metadata for the requesting DCN. In some embodiments, the MDP server module 140 is connected to a metadata agent (not shown in the figure) that runs on the same edge node on which the MDP server module 140 runs. The MDP server module 140, after identifying the logical forwarding element (or logical network) from which a metadata request packet is received (through the port that is associated with the logical switch), adds the logical network identification data to the packet (e.g., to one or more packet headers, to the packet payload, etc.) and forwards the packet to the metadata server 170 (or to a metadata agent which subsequently forwards the packet to the metadata server). The metadata server of some embodiments contains the required metadata for the DCNs of different logical networks.

Some embodiments employ a kernel network interface (KNI) on the MFE of the edge node that exchanges request packets between the MFE on the edge node and the MDP module via the edge node's kernel. In some embodiments, the edge MFE maps the logical network identifier (LNI) and/or logical switch identifier (LSI) to a destination port in the packet and sends the packet through KNI to the MDP module. In some embodiments, the metadata module's fixed IP address (e.g., 169.254.169.254) is actually the IP address of the KNI interface. The logical switch's port that is coupled to the logical MDP server of each logical switch is mapped to the same KNI interface (e.g., to IP 169.254.169.254) in some embodiments. This KNI interface is then added to the MDP server module (i.e., the MDP namespace).

The first stage 105 illustrates that at time T1, the VM 120 has generated and forwarded a metadata request packet 150 towards the MDP server (through the logical network 130). In some embodiments each time a DCN is initiated (i.e., starts executing) in a host machine, one of the first operations of the DCN is to generate and send out a request for metadata (e.g., after requesting for and receiving an IP address). Without the metadata, the DCN cannot operate, nor can it be identified by other network elements. The packet 150 includes many different packet headers for different network layer protocols. In the illustrated example, only two packet headers for two different network layers are shown, i.e., the source and destination IP headers, and the TCP source and destination ports. Each one of these headers contain a particular value that enables the different forwarding elements of the network to forward the packet towards its final destination (in the illustrated example, towards the metadata server 170).

The VM 120 generates the metadata request packet 150 and forwards it to a logical switch to which the VM is coupled. The packet includes a particular L3 destination address (e.g., "DIP" in this example) that is associated with the MDP server module 140 (how the VM adds the particular IP address to the packet will be described in more detail below). The VM also assigns port number 80 to the destination port 160 of the packet, since the metadata proxy is supposed to (from VM's perspective) listen to and accept the requests from TCP port 80. The VM also assigns the source IP address "SIP" (e.g., received from a DHCP server) and source port before forwarding the packet to the logical switch.

The logical switch, a logical port of which is coupled to VM 120, is one of the logical network elements in a tenant's logical network 130 that is implemented over a physical network infrastructure (e.g., across a set of physical nodes of a hosting system or datacenter). Another logical port of the logical switch is coupled to a logical MDP server which is another logical network element of the logical network 130. The logical MDP server is also assigned the particular IP address that is associated with the MDP server module and as such, the request packet 150 is forwarded to the logical MDP server. Logical MDP servers and their interactions with logical switches are described in more detail below by reference to FIG. 4.

In order to have a central MDP server provide MDP services to more than one logical switch of one logical network, some embodiments implement an MDP server module 140 on a physical node (e.g., an edge node, a host machine, etc.) of a hosting system. The MDP server module 140 of some embodiments, as stated above, is a namespace that executes on a physical node (e.g., an edge node) of the datacenter. The MDP server module implements one or more logical MDP servers, each of which is bound to a logical switch. On the other hand, the MDP server module 140 is also connected to a metadata server that stores the required metadata for every DCN that requests metadata (after instantiation). As such, the MDP server module 140 should be able to recognize the logical switch and subnet from which the metadata request is received in order to request (e.g., from the metadata server) for metadata that is associated with logical switch and subnet to which the DCN is connected.

The second stage 110 illustrates that at time T2, the metadata request packet 150 is sent from the logical network 130 towards the first port of MDP server module 140. The packet 150 is the same packet that was sent out from the VM 120 at stage 105. However, at this stage the destination port number in the TCP header of the packet has been replaced with port number "1" by the logical network 130 (e.g., by a managed forwarding element that implements the logical network).

Some embodiments substitute the TCP header with a new TCP header that corresponds to a particular logical switch from which the packet is received. The new TCP port number also corresponds to a particular port of the MDP server module 140 that is dedicated to listen to and provide metadata service for the particular logical switch. Since every packet that is forwarded to this port of the module is forwarded by the same logical switch, the module 140, by listening to this port, identifies the logical switch that has initiated the packet and adds the logical switch's information to the packet before forwarding the packet to the metadata server 170.

In the illustrated example, since logical network 130 (e.g., the logical switch that forwards the packet) is associated with port 1 of the MDP module, the managed forwarding element that implements the logical network forwards the packet 150 to the first port of the module. One of ordinary skill in the art would realize that the module 140 does not physically have different ports. The different ports are illustrated as individual ports in order to indicate that each port number in the packet header is listened to by a different instance of the MDP module 140 (as will be described in more detail below by reference to FIG. 6).

The third stage 115 shows that at time T3, the metadata request packet 150 is forwarded from MDP server 140 to the metadata server 170. At this stage, however, the packet contains additional identification data (added by the MDP server) that indicates which logical switch has originated the packet. The metadata server of some embodiments retrieves the metadata for the requesting DCN based on the added identification data in the packet. Although the metadata server 170 contains the required metadata for the different DCNs of logical networks, in some embodiments, the metadata server 170 (e.g., a Nova server) employs services of another server (e.g., a Neutron server) to receive more identification information (e.g., logical network's ID and tenant's ID) in order to retrieve metadata for the requesting DCN.

The metadata server retrieves the requested metadata for the DCN based on the additional identification information that the server receives from other databases. For example, in some embodiments, the metadata server 170 queries another server (e.g., Neutron server) with the DCN's source IP address and logical switch to which the DCN is connected in order to get additional identification data such as DCN and tenant identifiers. The metadata server 170 of some such embodiments, based on the received identification data retrieves the requested metadata for the requesting DCN (VM 120 in the illustrated example). The metadata server 170 then returns the requested metadata to the MDP module, which in turn returns the metadata to the requesting DCN.

In some embodiments, the metadata server is on a same physical network, a part of which implements one or more logical networks. For instance, in some embodiments, the metadata server operates in the same hosting system that implements (i.e., one or more host machines implement) the logical networks. In some such embodiments, however, the metadata server can be reached through an edge cluster (e.g., one or more edge nodes in the cluster) that is defined for a particular set of host machines that implements the logical networks. In some other embodiments, the metadata server is a remote server that does not operate in the same physical network. Such a remote metadata server can also be reached through the same edge cluster defined for the logical networks.

In some embodiments, the management plane (e.g., a manager machine, a manager application, etc.) receives the logical network topology (definition) from a user (e.g., a tenant in a datacenter). The user provides the logical network definition (e.g., logical network topology) to the management plane through a set of application programming interface (API) calls in some embodiments. The management plane, based on the received logical network definition, generates the necessary configuration data for the logical forwarding elements (e.g., logical switches, logical routers, logical MDP servers, etc.) and pushes this configuration data to a control plane (one or more controllers of a central control plane (CCP) cluster) of the network. The management and control planes configure the logical network elements on a set of physical nodes (e.g., host machines, gateway machines, etc.) that implements the logical network.

The control plane, in some embodiments, modifies the configuration of the logical forwarding elements (LFEs) on the physical nodes that implement the LFEs at runtime. That is, based on the generated configuration data that the control plane receives from the management plane and the runtime data that the control plane receives from the physical nodes, the control plane modifies the configuration of the LFEs on the physical nodes at runtime. In some embodiments, as will be described in more detail below, the management and control planes configure the LFEs on a physical node by configuring a managed forwarding element (MFE) that executes on the physical node (e.g., in the virtualization software of the physical node) to implement the LFEs of the logical network.

A logical network topology, in some embodiments, includes a set of logical network entities that are placed on different logical paths of the network. Examples of logical network entities in a logical network include logical forwarding elements (e.g., logical L2 and L3 switches, logical routers), logical middleboxes (e.g., logical firewalls, logical load balancers, etc.), logical MDP servers, and other logical network elements such as a source or destination data compute node (DCN) and a tunnel endpoint (e.g., implemented by an MFE). While a DCN or tunnel endpoint typically operates on a single host machine, a logical forwarding element or logical middlebox spans several different MFEs (e.g., software and/or hardware MFEs) that operate on different machines (e.g., a host machine, a top of rack hardware switch, etc.).

The logical forwarding elements of a logical network logically connect several different DCNs (e.g., VMs, containers, namespaces, etc.) that run on different host machines, to each other and to other logical and/or physical networks. In some embodiments, different subsets of DCNs reside on different host machines that also execute the MFEs. Each MFE, as stated above, executes on a physical node (e.g., a host machine) and implements the logical forwarding elements of the logical network to which a subset of DCNs that runs on the host machine is logically connected.

One of the logical elements that a user may define for the logical network topology is a logical metadata proxy (MDP) server that provides MDP service for a set of data compute nodes connected to a logical forwarding element (e.g., a logical switch). In some embodiments, when the user defines a logical MDP server for a logical switch, the management plane automatically generates a logical MDP port on the logical switch for the logical MDP server. The management plane then assigns unique MAC and IP addresses to the logical port in order to couple the logical port to a physical MDP server module executing on an edge node of the network (e.g., an edge node of a datacenter). That is, the management plane assigns the IP address that is associated with the MDP server module to the logical MDP port of the logical switch, so that when a metadata request packet is received by this logical port, the packet is forwarded towards the MDP server module.

In some embodiments, each set of defined logical MDP servers gets mapped to a physical MDP server operating in an edge node of an edge cluster in order to enable scalability. That is, for example, different logical MDP servers of a first set of logical networks may be mapped to a first MDP server module that executes on a first edge node (in a first edge cluster), while the logical MDP servers of a second set of logical networks are mapped to a second MDP server module that executes on a second edge node (e.g., in the same first edge cluster or a different, second edge cluster).

An MFE, in some embodiments, is an application and/or process that executes in a virtualization software (e.g., a hypervisor) of a physical node that implements one or more logical network elements of one or more logical networks. For example, implementing the LFEs of a logical network on a host machine includes performing network traffic forwarding processing for the packets that are originated from and/or destined for a set of DCNs that resides on the host machine on which the MFE operates. Additionally, as a particular host machine may host DCNs of more than one logical networks (e.g., belonging to different tenants), the MFEs running on the host machine may implement different sets of LFEs that belong to different logical networks.

As described above, a set of MFEs (e.g., a particular MFE in the set) that executes on a particular machine on which an MDP server module also executes, replaces (in the TCP destination port header) a fixed port number of the packets that are destined for the MDP server with different port numbers depending on which logical switch has originated the packets. In some embodiments, the set of MFEs executes on an edge node of a physical network infrastructure (e.g., a datacenter) over which the logical networks are implemented. An MFE in the set implements a virtual tunnel endpoint (VTEP) which exchanges network data with other MFEs that execute on other host machines and/or edge nodes. In some embodiments, the edge node (e.g., a gateway machine) is one of several edge nodes of an edge cluster that connects a logical network to other logical networks and/or to external networks (e.g., external logical and/or physical networks).

Figure 2:
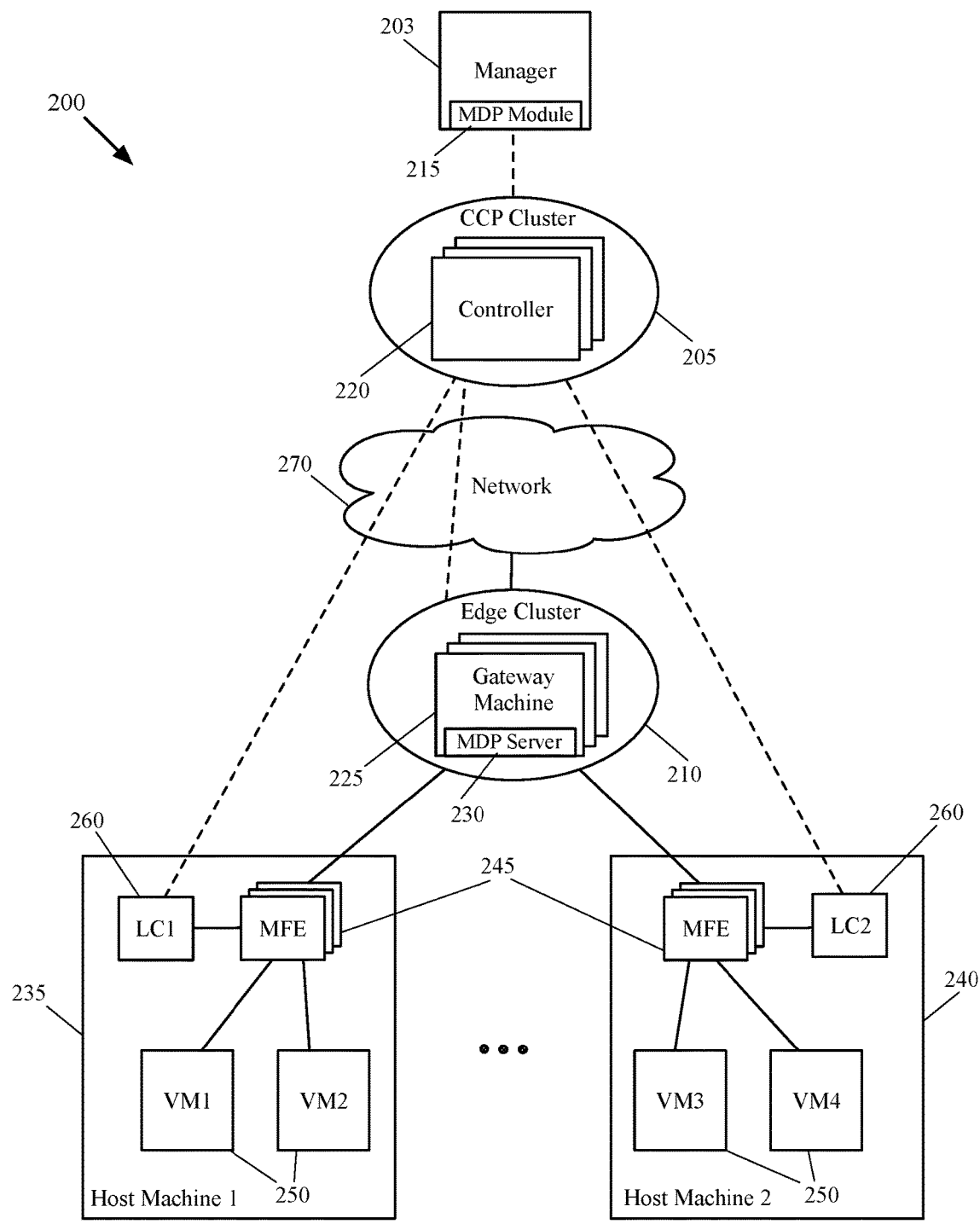
FIG. 2 conceptually illustrates a physical network topology that connects one or more logical networks implemented on the physical nodes of the network to one or more external networks.

FIG. 2 conceptually illustrates a physical network topology 200 that connects one or more logical networks implemented on the physical nodes of the network to one or more external networks. More specifically, this figure shows different physical nodes such as host machines, gateway machines, managers, and controllers of a physical network (e.g., a datacenter) that implement logical network entities of different logical networks. FIG. 2 includes a manager 203, a controller cluster 205, an edge cluster 210, an external network 270, and two host machines 235 and 240. Each of the host machines shown in the figure includes a set of managed forwarding elements 245, a local controller 260, and a set of data compute nodes 250 (VM1-VM4).

In some embodiments, the MFEs 245, as described above, are implemented in the virtualization software (e.g., hypervisor) of the host machines 235 and 240 (the hypervisors are not shown in the figure for simplicity of description). The controller cluster 205 includes a set of controllers 220 that control the data exchange between the logical forwarding elements. The edge cluster 210 includes a set of edge nodes (e.g., gateway machines) 225 that connect one or more logical networks implemented on the physical nodes to the external network 270.

For example, a logical network, which logically connects the VMs executing on the host machine 235 to the VMs that execute on the host machine 240, can be connected to the external network 270 through one or more gateway machines 225 of the edge cluster 210. The external network 270 may then connect the VMs 250 running on the host machines to other logical networks that are implemented on other host machines (in the same hosting system). The external network 270 may also connect the VMs to other physical and/or logical networks (e.g., external physical networks or logical networks that are not implemented by the hosting system).

The logical network (e.g., a set of logical switches, logical routers, logical MDP servers, logical load balancers, etc.) is configured and managed by the manager 203 and CCP cluster 205. The logical network (i.e., the different forwarding elements of the logical network) is implemented by the MFEs 245 that run on the host machines and other MFEs (not shown in this figure) that run on the edge nodes of the edge cluster 270. The dashed lines that connect the management and control plane to the edge cluster and host machines represent the management and control plane data exchange while the solid lines represent the data plane network data exchange between the host machines and edge cluster.

The manager 203 can be a manager of a management cluster that includes several other managers each of which manages one or more logical networks in some embodiments. Each of the managers and controllers can be a physical computing device (e.g., a server, a computer, etc.), a data compute node (DCN) such as a virtual machine (VM), a container, etc., or a software instance (or a process) operating on a physical computing device or DCN. In some embodiments, a manager includes different user interface applications for administration, configuration, monitoring, and troubleshooting one or more logical networks in the physical network infrastructure (e.g., a hosting system network). These applications, in some embodiments, include a particular MDP module 215 through which a user can define different logical MDP servers and bind these logical MDP servers to different logical switches.

In some embodiments, the management plane (e.g., the MDP module 215 running on a manager machine 203) selects two edge nodes from the edge cluster (or two host machines from the physical nodes of the network) to implement the MDP server module. In some such embodiments, the first edge node implements a master (or active) MDP server and the second edge node implements a backup (or standby) MDP server. Thus, a particular one of the MDP server modules is an active MDP server that includes a set of L4 ports for a particular set of logical MDP servers, while the other MDP server module is a standby MDP server that includes the same set of L4 ports for the same particular set of logical MDP servers in case a failover process is activated.

When the logical MDP server is implemented on two different MDP server modules (that operate on two different edge nodes) with active-standby implementation, the set of managed forwarding elements at the DCN's host machine sends the metadata request packet to only the active MDP server module (e.g., via a tunnel between the host machine and the edge node) in some embodiments.

In some embodiments a user (e.g., a datacenter network administrator) specifies, through the MDP module 215, which edge nodes of the edge cluster should implement the MDP server modules (e.g., the active and standby modules). In some embodiments, if a user does not assign the edge nodes, the management plane of the network (e.g., the MDP module 215) automatically creates the MDP server modules 230 on available edge nodes in the edge cluster. In some embodiments the management plane automatically assigns the edge nodes upon receiving a definition of a new logical MDP server that has to be implemented by an MDP server module. In some other embodiments, the management plane assigns the edge nodes at boot time of the edge cluster of the network.

As described above, the CCP cluster (e.g., one or more controllers 220 in the cluster) controls the network data communication between the different DCNs of a logical network (e.g., between the VMs 250 in the illustrated example) by controlling the data communications between the MFEs 245. The CCP cluster communicates with the MFEs 245 in order to control the data exchange between the MFEs since the MFEs also implement virtual tunnel endpoints (VTEPs) that ultimately exchange the logical network data between the DCNs. In order to control the data exchange, the CCP cluster of some embodiments receives runtime data for the logical network entities (e.g., VMs 250, updated forwarding data for LFEs, etc.) from each of the MFEs. The CCP cluster 220 also receives configuration data for logical network elements from the management cluster (e.g., the manager 203) and uses this data along with the runtime data in order to control the data communications of the logical network.

Although not shown, some embodiments implement an MDP module within the CCP cluster that is responsible for configuring the MDP server module 230 on one or more edge nodes of the edge cluster 210. The CCP cluster module receives the MDP server configuration data (e.g., logical DHCP server definitions, logical switch bindings, etc.) from the management plane (e.g., from the MDP module 215) and configures the MDP server module on the edge nodes based on the defined configuration, as well as runtime updates (e.g., to logical MDP servers) received from the MFEs. For example, when an MDP server binding is moved from one edge node to another, the CCP cluster module removes the MDP server module from the first edge node and adds/updates the MDP server module on the other edge node.

A local controller 260, which also executes in a hypervisor of each host machine in some embodiments, receives logical network data from a controller 220 of the CCP cluster 205. The local controller 260 then converts and customizes the received logical network data for the local set of MFE 245 that operates on the same machine on which the local controller operates. The local controller then delivers the converted and customized data to the local set of MFEs 245 on each host machine. The set of MFEs on each host machine implements the logical network based on the forwarding data that the MFEs receive from their corresponding local controller. In some embodiments one MFE in the set of MFEs implements every logical network element (e.g., logical switches, routers, etc.), while in other embodiments each MFE in the set of MFEs implements a number of the logical network elements.

In some embodiments, the connections of the end machines to an LFE (e.g. a logical switch) are defined using logical ports of the LFE, which are mapped to the physical ports of the MFEs (e.g., a first logical port of a logical switch is mapped to a physical port of an MFE that is coupled to VM1 running on the host machine 235, and a second logical port of the logical switch is mapped to a physical port of an MFE that is connected to VM3 running on the host machine 240).

When an MFE receives a packet from a DCN (e.g., VM1) that couples to a first port of a logical switch, the MFE performs the network forwarding processing for the logical switch, to which the DCN is logically coupled. The same MFE, or another MFE in the set of MFEs, also performs the forwarding processing for any additional LFE (e.g., logical router processing if the packet is sent to an external network (e.g., external network 270), logical router processing and processing for another logical switch in the network if the packet is sent to a DCN coupled to the other logical switch, etc.).

Based on the forwarding processing, the set of MFEs can decide where to send the received packet. For example, if the set of MFEs running on the host machine 235 decides to send a packet from VM1 to VM3, which is coupled to a second port of a logical switch that is implemented by a particular MFE on host machine 240, the set of MFEs sends the packet to the particular MFE (through a tunnel that is established between the sets of MFEs running on the host machines), to be delivered to VM3.

One of ordinary skill in the art would realize that the number of the host machines, managers, controllers, edge nodes, and virtual machines illustrated in the figure are exemplary and a logical network for a tenant of a hosting system may span a multitude of host machines (and third-party hardware switches), and logically connect a large number of DCNs to each other (and to several other physical devices that are connected to the hardware switches). Additionally, while shown as VMs in this figure and other figures below, it should be understood that other types of data compute nodes (e.g., namespaces, containers, etc.) may connect to logical forwarding elements in some embodiments.

Figure 3:
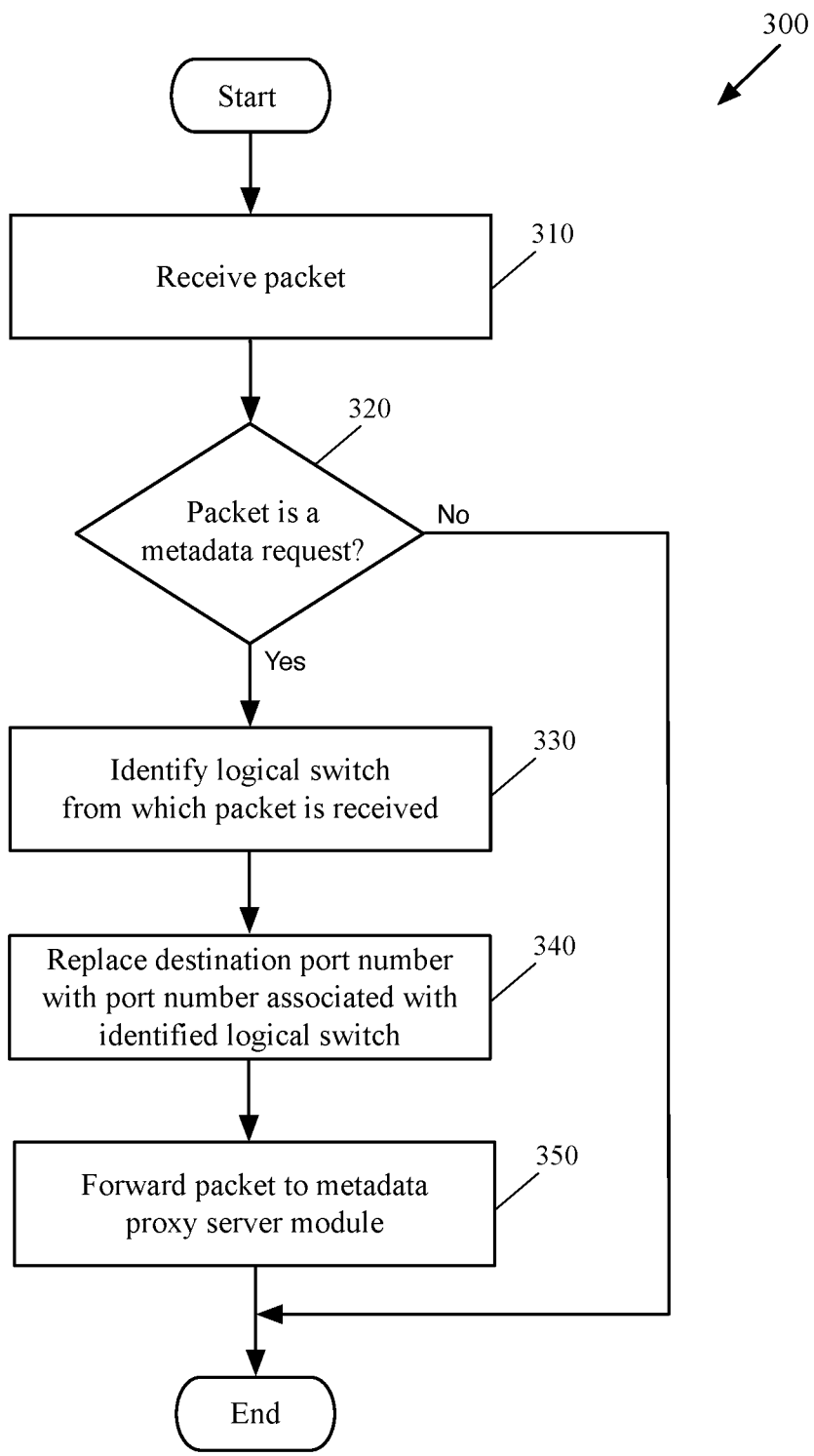
FIG. 3 conceptually illustrates a process of some embodiments for replacing an L4 destination port of a metadata request packet with a new destination port number that is associated with a logical switch from which the packet is received.

FIG. 3 conceptually illustrates a process 300 of some embodiments for replacing an L4 destination port of a metadata request packet with a new destination port number that is associated with a logical switch from which the packet is received. A particular instance of an MDP server module, which provides metadata for the DCNs coupled to the logical switch, listens to the new port number for incoming metadata requests. In some embodiments, the process 500 is performed by a set of managed forwarding elements (e.g., an MFE in the set of MFEs) that executes on a same edge node on which the MDP server module operates.

The process starts by receiving (at 310) a packet that is originated and forwarded by a data compute node (e.g., a virtual machine that runs on a host machine). The process then determines (at 320) whether the packet is a metadata request packet or not. The process of some embodiments makes such a determination by looking at the L3 and L4 destination address and ports. In some embodiments, each DCN that generates a metadata request packet, inserts a particular address (e.g., 169.254.169.254), which is an IP address that is associated with an MDP server module, in the L3 destination address header of the packet. The DCN also inserts a particular port number (e.g., 80), which is a port number to which the MDP server module supposedly listens, in the L4 destination port number of the packet. If the process identifies these two values in the corresponding packet headers, the process determines that the packet is a metadata request packet.

When the process determines that the packet is not a metadata request packet, the process ends. In other words, the process does not need to modify any of the packet headers for metadata proxy related processing. Such a packet could be a data packet that is generated by a DCN and is simply received by an edge node datapath in order to be forwarded to an external network outside the logical network (e.g., through a service router component of a logical router that handles north-south network traffic). The external network could be another logical network that is also implemented on the same hosting system, or a logical network that is implemented on another physical network, or another external network.

On the other hand, if the process determines that the packet is a metadata request packet, the process identifies (at 330) the logical switch from which the packet is received. As will be described in more detail below by reference to FIG. 6, the MFE that inserts the new destination port number in the packet is able to identify the logical switch form which the packet is received because the MFE also implements the port of logical switch that is associated with the logical MDP server.

For example, when a first MFE implements a logical switch to which a source DCN (i.e., a DCN that originates a metadata request packet) is logically connected, the MFE receives the metadata request packet from the DCN to perform forwarding processing for the logical switch (i.e., for the logical switch port to which the source DCN is connected). After performing the forwarding processing, the first MFE realizes that the packet should be forwarded to a logical MDP server (i.e., to a logical MDP port of the logical switch). The first MFE then realizes (based on forwarding tables of the MFE) that a second MFE on an edge node implements the logical MDP port of the logical switch. As such the first MFE forwards the packet to the second MFE (i.e., the process encapsulates the packet with the required tunneling data and tunnels the packet to the second MFE). Therefore, the second MFE, which performs forwarding processing for the logical MDP port of the logical switch, can identify which logical switch the packet has been sent from and inserts a new destination port number based on the identified logical switch.

After identifying the logical switch, the process replaces (at 340) the destination port number in the L4 (TCP) header of the packet with a new port number that is associated with the identified logical switch. As described before, the process does so because an instance in the MDP server module that is dedicated to provide metadata proxy service for the identified logical switch only listens to that new port number. The process of some embodiments uses a mapping table to map the identified logical switch to the L4 destination port that provides metadata proxy service for the identified logical switch.

The process then forwards (at 350) the packet to the MDP server module. As described above, the MFE (that performs the process 300) implements the logical MDP port on the logical switch from which the packet is received. As such, after performing the forwarding processing for this logical port, the MFE forwards the packet to the MDP server module using the MAC and IP address of the logical MDP server. After forwarding the packet to the MDP server module (which executes on the same edge node on which the MFE that performs the process 300 executes), the process ends.

The specific operations of the process 300 may not be performed in the exact order shown and described. The specific operations may not be performed in one continuous series of operations, and different specific operations may be performed in different embodiments. Additionally, one of ordinary skill in the art would realize that the process 300 could be implemented using several sub-processes, or as part of a larger macro process.

Figure 4:
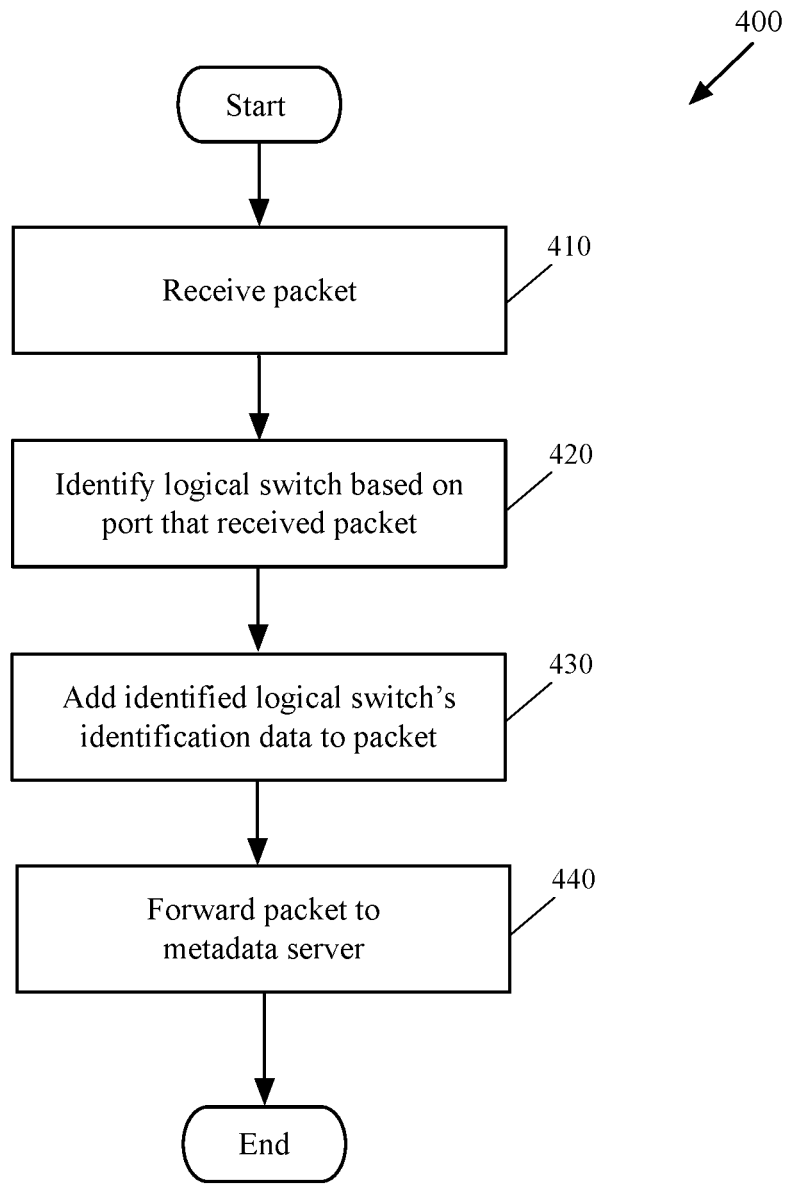
FIG. 4 conceptually illustrates a process of some embodiments for providing metadata proxy service to a set of logical switches that belong to different logical networks (e.g., different tenants of a datacenter).

FIG. 4 conceptually illustrates a process 400 of some embodiments for providing metadata proxy service to a set of logical switches that belong to different logical networks (e.g., different tenants of a datacenter). Each logical network may include a subset of one or more logical switches in the set of logical switches. In some embodiments, the process 400 is performed by a metadata proxy server module that operates (executes) on an edge node of an edge cluster. As described above, in some embodiments the MDP server module is a namespace that is created on the edge node (e.g., after a user defines a new logical MDP server) and includes several ports (e.g., TCP ports) each of which is listened to by a particular metadata proxy instance. Each port of the MDP server module is dedicated to a particular logical forwarding element (LFE) of a logical network (or a particular logical network).

The process starts by receiving (at 410) a metadata request packet that was originated from a source data compute node and forwarded by a managed forwarding element that operate on the same edge node as the MDP server module. At 420, the process identifies the logical switch, to which the source DCN is logically connected, based on the particular port that receives the packet. That is, a particular process in the MDP server module that listens to the port through which the packet is received, knows that this port is dedicated to a particular logical switch. As such, the module, after receiving the packet, can identify the logical switch from which the packet is received.

After identifying the logical switch, the process adds (at 430) the identified logical switch's identification data to the metadata request packet. In some embodiments, the metadata request packet is an HTTP packet and the process adds the identification data (for the logical switch) to one or more HTTP headers of the packet. In some other embodiments, the process adds the identification data to the payload of the packet. The process then forwards (at 440) the packet to a metadata server. At this point, the packet includes the required data (i.e., the source IP address which indicates the IP address for the source DCN, and the logical switch's ID which can be a UUID that is different for each logical switch (e.g., in a datacenter)) to be identified by the metadata server for providing metadata.

Although the metadata server contains the required metadata for the different DCNs of logical networks, in some embodiments, the metadata server (e.g., a Nova server) employs services of another server (e.g., a Neutron server) to receive more identification information (e.g., logical network's ID and tenant's ID) in order to retrieve metadata for the requesting DCN. The metadata server retrieves the requested metadata for the DCN based on the additional identification information that the server receives from other databases. For example, in some embodiments, the metadata server queries another server (e.g., Neutron server) with the DCN's source IP address and logical switch to which the DCN is connected in order to get additional identification data such as DCN and tenant identifiers. The metadata server of some such embodiments, based on the received identification data retrieves the requested metadata for the requesting DCN.

The specific operations of the process 400 may not be performed in the exact order shown and described. The specific operations may not be performed in one continuous series of operations, and different specific operations may be performed in different embodiments. For example, in some embodiments, the process 400 forwards (at 440) the metadata request packet to a metadata agent instead of a metadata server. In some such embodiments, the metadata agent runs on the same edge node on which the MDP server module runs. The metadata agent then forwards the packet to the metadata server. Additionally, one of ordinary skill in the art would realize that the process 400 could be implemented using several sub-processes, or as part of a larger macro process.

As described above, a user (e.g., in a hosting system) specifies a logical network topology by defining different logical elements of the logical network (e.g., logical switches, routers, metadata servers, etc.) for a management plane (e.g., a manager machine or application in a management cluster). The user defines the logical network elements through a set of application programming interface (API) calls. The management plane, based on the received logical network definition, generates the necessary configuration data for the logical elements and pushes this configuration data to one or more controllers in a central control plane (CCP) cluster of the network. Based on the generated configuration data, the control plane configures the logical elements on a set of physical nodes (e.g., host machines, gateway machines, etc.) that implements the logical network.

One of the logical elements that a user may define for the logical network topology is a logical MDP server that provides metadata proxy service for every data compute node (e.g., a virtual machine, a container, a namespace, etc.) that is connected to a logical forwarding element (e.g., a logical switch). In some embodiments, when the user defines a logical MDP server for a logical switch, the management plane automatically generates a logical MDP port on the logical switch for the logical MDP server. The management plane then assigns unique IP and MAC addresses to the logical MDP port in order to couple the logical MDP port to a physical MDP server module that executes on an edge node.

Figure 5:
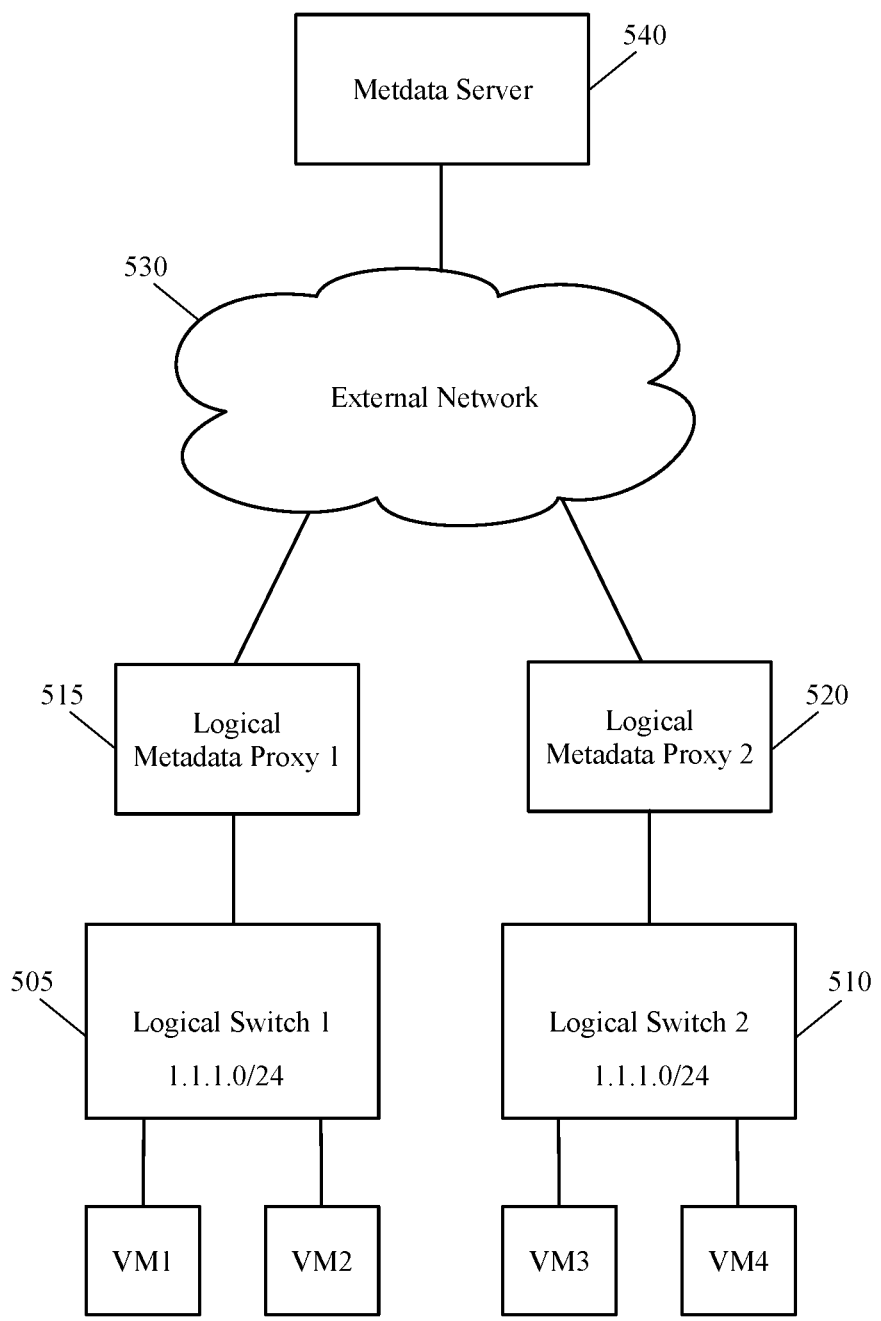
FIG. 5 illustrates two different logical networks (e.g., defined by two tenants of a hosting system, defined by a network administrator of a datacenter, etc.) with two different logical metadata proxy servers that each provides MDP service to one of the logical networks.

FIG. 5 illustrates two different logical networks (e.g., defined by two tenants of a datacenter, defined by a network administrator of a datacenter, etc.) with two different logical metadata proxy servers that each provides MDP service to one of the logical networks. The first logical network includes a logical switch 505 that logically connects DCNs VM1 and VM2 to each other, to the logical MDP server 515, and to other logical and physical networks through the external network 530. Similarly, the second logical network includes a logical switch 510 that logically connects DCNs VM3 and VM4 to each other, to the logical MDP server 520, and to other logical and physical networks through the external network 530. The logical MDP server 515 is defined by a user (e.g., a first tenant) to provide MDP service to DCNs VM1 and VM2, while the logical MDP server 520 is defined by a same or different user (e.g., a second tenant) to provide MDP service to DCNs VM3 and VM4.

Additionally, as shown in the figure, the first logical switch has a first subnet address (i.e., 1.1.1.0/24) specified by a user. For example, at the time of defining the first logical network, a first tenant has specified that any DCN that is coupled to the first logical switch has to be assigned an IP address that falls under the first subnet address range (e.g., provided by a first logical DHCP server). As also illustrate in the figure, the second logical switch has a same subnet address (i.e., 1.1.1.0/24) assigned for the DCNs that are logically connected to this logical switch. For example, at the time of defining the second logical network, a second tenant of the datacenter has specified that any DCN that is coupled to the second logical switch has to be assigned an IP address that falls under the second subnet address range, which is the same range as the first subnet address range.

As such, when a central MDP server module that implements both of logical MDP servers 515 and 520 receives a request (through a single TCP port that is specified as destination port numbers in the request packet) to provide metadata to one of the DCNs, the module should be able to distinguish the requests from each other. In other words, the MDP server module should use a mechanism to identify from which logical switch and network the request is received and provide metadata for the requesting DCN accordingly.

In some embodiments, when a user defines a logical MDP server to be bound to a logical switch, the management plane assigns a unique metadata proxy IP address (e.g., 169.254.169.254) to the defined MDP server. That is, the management plane creates a new logical port on the logical switch, and assigns the IP address (and a MAC address) to the created logical port. This unique IP address is associated with an MDP server module that operates on an edge node in some embodiments.

However, a DCN that initiates a metadata request packet does not have the IP address that is associated with the logical MDP port of the logical switch when the DCN is instantiated in a host machine. In some embodiments, when a DHCP server is present and provides DHCP services for the logical switch to which the DCN is coupled, the DHCP server adds the metadata proxy IP address to the routing table of the DNC. That is, when the DCN sends a request for an IP address (to be assigned to the DCN) to a DHCP server, the DHCP server returns both an IP address for the DCN and a unique metadata proxy server IP address to the DCN. In some embodiments, the MDP server IP address is returned to the DCN as a classless static IP address through DHCP option 121 in some embodiments. Another method of adding the MDP server IP address to a DCN's routing table is to add the address manually to the table. That is, in some embodiments, when a DHCP server is not available, a user may manually add the IP address as a static route to the routing table of the DCN.

Some embodiments allow a user to assign this unique IP address (e.g., 169.254.169.254) when the logical switch is coupled to a logical router. In order to do so, the management (or control) plane defines an internal logical switch that is placed between the logical router and a logical MDP server in the north-south path. The manager assigns a particular IP address that is associated with the logical MDP's IP address to this internal logical switch (e.g., 169.254.169.252/30).

The management plane of some embodiments connects the internal logical switch to the logical router by assigning the north interface of the logical router an IP address of 169.254.169.253, which is associated with the south logical port of the internal logical switch. The management plane also binds the logical MDP server to the internal logical switch by assigning the south interface of the logical MDP server an IP address of 169.254.169.254, which is associated with the north logical port of the internal logical switch. As such, the user can add a route to address 169.254.169.254 (logical MDP server address) via the logical router inside the DCNs routing table. This way, the DCN can generate and send out the metadata request packet with a destination IP address of the logical MDP server (which is also associated with the MDP server module).

Figure 6:
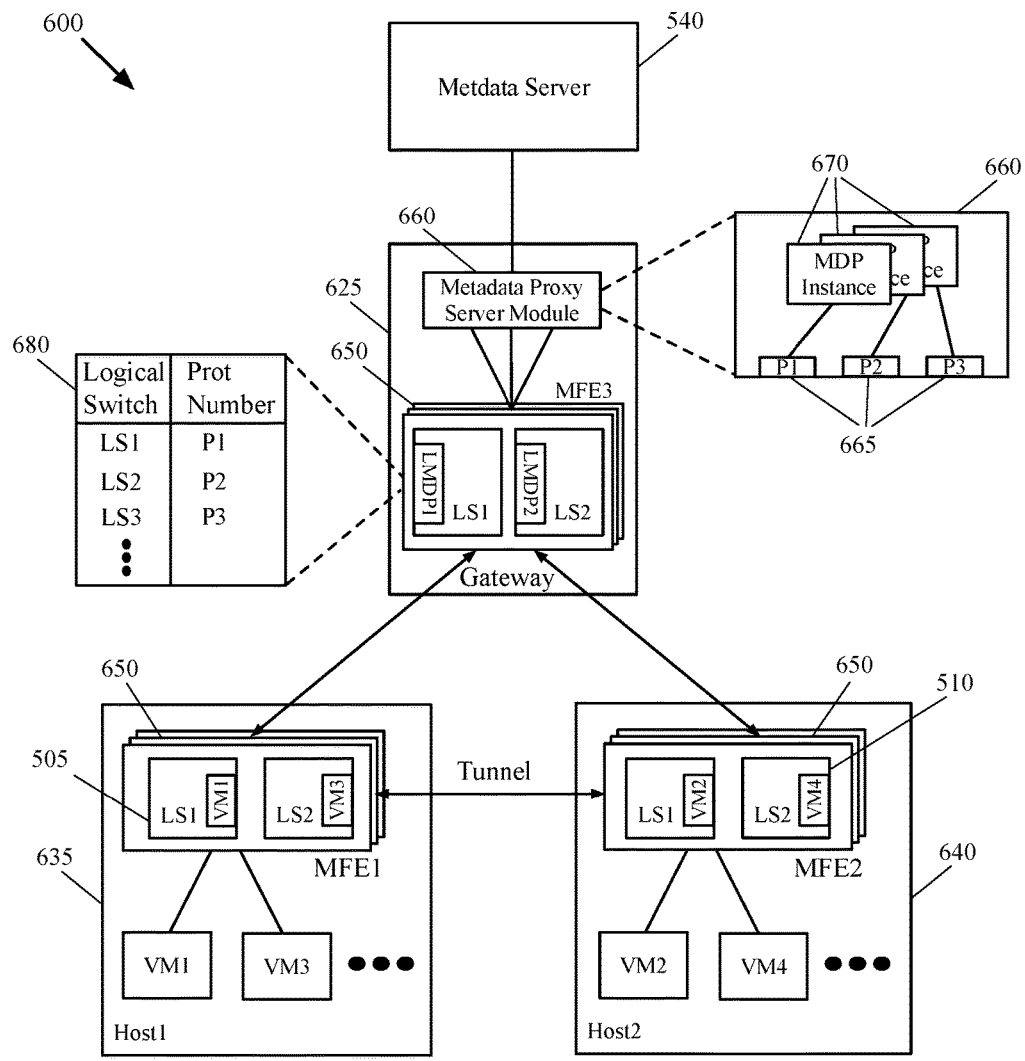
FIG. 6 illustrates a physical network (i.e., a portion of a physical network) that implements the two logical networks shown in FIG. 5.

FIG. 6 illustrates a physical network (i.e., a portion of the physical network) that implements the two logical networks shown in FIG. 5. More specifically, this figure shows a physical network architecture 600 that includes a metadata server 540, a gateway machine 625 (as an edge node), and two host machines 635 and 640 which host virtual machines of different logical networks. Each of the illustrated physical nodes includes a set of MFEs 650 (e.g., operating in the virtualization software of the physical nodes in some embodiments). The host machine 635 hosts the virtual machines VM1 and VM3 along a set of other data compute nodes, while the host machine 640 hosts the virtual machines VM2 and VM4 along a set of other data compute nodes. The gateway machine 625 implements (i.e., executes) an MDP server module 660.

The edge node 625 that implements the MDP server module 660 can be selected from an edge cluster manually (e.g., by a network administrator), or it can be selected automatically by the management plane. It should be understood that although in this figure and other examples, only one edge node that executes an active MDP server module is illustrated, some embodiments provide a couple of edge nodes in an edge cluster, one of which implements an active MDP server module and the other one implements a standby MDP server module.

Having an active-standby design for MDP server modules enables the network to implement a failover process and to provide continuity in providing MDP services. In some embodiments, the forwarding addresses of the standby edge node is not published to the management and CCP clusters by the edge node. Instead, in some embodiments, the host machines learn the IP address of the standby edge node during the failover process. That is, when a standby MDP server module running on a standby edge node takes over the responsibilities of an active MDP server module running on an active edge node, it sends messages to all of the host machines (i.e., the MFEs running on the host machines) that implement the corresponding logical MDP servers to force the host machines to learn the new location of the MDP server module (e.g., the IP address of an MFE that executes on the edge node).

Returning to FIG. 6, each set of MFEs 650 implements the logical forwarding elements (LFEs) of the logical networks by performing the forwarding processing of the LFEs for the packets that are received from or sent to the corresponding VMs that are connected to the MFEs. Although shown as a set of MFEs, not always two or more MFEs are involved in executing the forwarding pipelines of the logical elements. For example, based on the number of logical elements and other factors, the number of MFEs in a set of MFEs that implement the logical elements may vary. In some embodiments, each MFE in the set may implement a certain number of logical elements, a certain type of logical elements, or a combination of both. As such, in the following examples, although only one MFE is used to describe the functionality of the set of MFEs, it should be understood that more than one MFEs in each set may perform the described functionality.

In the illustrated example, a first logical port of the logical switch 505 is mapped to a physical port of MFE1 that is coupled to VM1 executing on the first host machine 635. A second logical port of the logical switch 605 is mapped to a physical port of MFE2 that is coupled to VM2 executing on the second host machine 640. Similarly, a first logical port of the logical switch 510 is mapped to another physical port of MFE1 that is coupled to VM3 executing on the first host machine 635, while a second logical port of the logical switch 610 is mapped to anther physical port of MFE2 that is coupled to VM2 executing on the second host machine 640. The MFEs are also connected to each other through the illustrated tunnels in order to exchange network data after performing the forwarding functionalities of the logical forwarding elements.

A third set of MFEs that operates on the gateway machine 625 also implements the same first and second logical switches 605 and 610. However, as shown in the figure, this set of MFEs implements the logical ports of these logical switches that are connected to the logical MDP servers 515 and 520 of FIG. 5. More specifically, an MDP logical port of the logical switch 505 is mapped to a physical port of MFE3 that is coupled to the MDP server module 660. Additionally, an MDP logical port of the logical switch 510 is also mapped to the same physical port of MFE3 that is coupled to the MDP server module 660.

Although, in the illustrated example two end machines that are connected to the same logical switch are hosted by two different host machines (e.g., VM1 and VM2 that are connected to the same logical switch, execute on two different host machines Host1 and Host2), two or more end machines that are connected to a same logical switch may operate on the same host machine. The virtual machines VM1 and VM3 communicate (e.g., exchange network data) with each other, with DCNs of the same or different logical networks (e.g., virtual machines VM2 and VM4), and with other logical and/or physical networks via the managed forwarding elements that implement the logical entities of the logical networks.

As described above, the MFEs 650 operating on the host machines are physical software switches provided by the hypervisors or other virtualization software of the host machines. These MFEs perform the entire first-hop forwarding processing for the logical switches 505 and 510 on packets that are received from the virtual machines VM1-VM4 of the logical networks. The MFEs residing on the host machines Host1 and Host2 may also implement logical switches (and distributed logical routers) for other logical networks if the other logical networks have VMs that reside on the host machines Host1 and Host2.

Since each set of MFEs 650 may perform first hop processing, each set of MFEs implements all of the logical forwarding elements including the logical switches 505 and 510, as well as other logical elements. The MFEs may be flow-based forwarding elements (e.g., Open vSwitches) or code-based forwarding elements (e.g., ESX software switches), or a combination of the two, in various different embodiments. These different types of forwarding elements implement the various logical forwarding elements differently, but in each case they execute a pipeline for each logical forwarding element that may be required to process a packet.

In some embodiments, when the MFE receives a packet from a VM that is coupled to the MFE, it performs the forwarding processing for the logical switch to which that VM logically couples. The MFE also performs the forwarding processing for any additional logical forwarding elements (e.g., logical router processing if the packet is sent to an external network, logical router processing and processing for the other logical switch in the network if the packet is sent to an end machine coupled to the other logical switch, etc.).

As an example, when VM2 starts executing on the host machine 640, it generates a metadata request packet and forwards the packet to a logical VM2 port of the logical switch that is implemented by MFE2 (i.e., MFE performs the executes the forwarding pipeline of this logical port which is mapped to one of its physical ports). When VM2 sends the packet, the datapath on MFE2 initially runs the logical switch 505 pipeline (e.g., based on the ingress port through which the packet is received, the source MAC address, etc.). This pipeline specifies to forward the packet to the logical MDP port of the logical switch (e.g., based on the destination MAC and IP address in the packet). The pipeline then identifies MFE3 that executes on the edge node 625 as the MFE that performs the forwarding processing for the logical MDP port of the logical switch (i.e., LMDP1 port shown in the figure).

As such, the pipeline encapsulates the packet with tunneling data and tunnels the packet to the gateway machine 625 that runs MFE3. That is, MFE2 encapsulates the packet with the required data to send the packet to MFE3 (e.g., MFE2 adds its own IP address to the outer packet header as the source VTEP and the IP address of MFE3 as the destination VTEP). The source VTEP encapsulates the packets using a particular tunnel protocol (e.g., VXLAN protocol), and forwards the packets towards the destination VTEP. The destination VTEP then decapsulates the packets using the same particular tunnel protocol and forwards the packets towards a destination VM.

When MFE3 on the gateway machine 625 receives the encapsulated metadata request packet, this MFE decapsulates the packet (i.e., removes the tunneling data in the outer header of the packet), and identifies the MDP server module 660 based on the logical context information in the packet as well as the destination MAC and IP addresses that corresponds to the MDP server module 660. However before sending the packet to the DHCP server module, the manage forwarding element MFE3 (e.g., the same MFE that receives the packet, or another MFE in the set of MFEs) replaces the destination port number in the L4 header of the packet with a port number of the MDP server module that is associated with (i.e., provides MDP service to) the logical switch 505.

In some embodiments, MFE3 employs a local mapping table 680 to map the logical switch from which the packet is received to the L4 destination port. As shown, the mapping table 680 includes a logical switch column and a corresponding port number column. In some other embodiments the local table 680 may include other columns (fields) as well. For example, in some embodiments this table includes a column that specifies the logical network (e.g., a logical network identifier column) or any other type of identification data. Therefore, when MFE 3 receives the packet, this MFE looks up the logical switch's identifier in the table 680. As illustrated in the figure, "LS1" is the logical switch identifier for logical switch 505. The corresponding port number for this identifier in the table is the port number "P1."

Therefore, MFE3 replaces the original destination port number (e.g., port 80) with P1 in the L4 header of the packet and forwards the packet to the MDP server module (through the MFE port on which the logical MDP port of the logical switch is mapped). It should be understood that although three different lines are shown to connect MFE3 to the different ports of the MDP server module 660, in reality there is only one connection between these two modules and the illustrated different lines merely show that each packet can have one of these destination ports in the packet header.

As described above, the MDP server module 660 of some embodiments is a namespace operating on the edge node 625 that includes several ports 665, each of which is listened to by a particular metadata proxy instance 670. Each port 665 of the MDP server module is dedicated to a particular logical switch of the logical network (e.g., specified or indicated in the local mapping table 680). When the MDP server module receives the packet on port P1 (i.e., the MPD instance 670 that is associated with the port number P1 in the MDP server module, listens to port P1 received the packet), the module identifies logical switch 505 as the logical switch from which the packet is received (e.g., through a same or similar mapping table 680). As such, the MDP server module adds the required identification information (e.g., VM2's source IP address and logical switch 505's identification data) to the packet and forwards the packet to the metadata server 540.

A user may query the management plane for the status of a logical MDP server in a logical network or the status of a physical MDP server module that implements one or more logical MDP servers. The queried status may include metadata related information such as CPU and memory utilization per logical switch, logical network, or DCNs that are connected to a logical switch. The status report may also contain other kinds of information such as connectivity status with the metadata server (e.g., Nova server) or other statuses in some embodiments. In some embodiments, these statuses are reported to a user (through the management plane) upon occurrence of a particular event. For example, in some embodiments, the MDP server related statuses are reported to one or more users each time a new logical MDP server is added to a logical network or is bound to a logical switch of a logical network. In some other embodiments the status is reported each time an edge node that implements an MDP server module fails. Some other embodiments generate status reports periodically.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
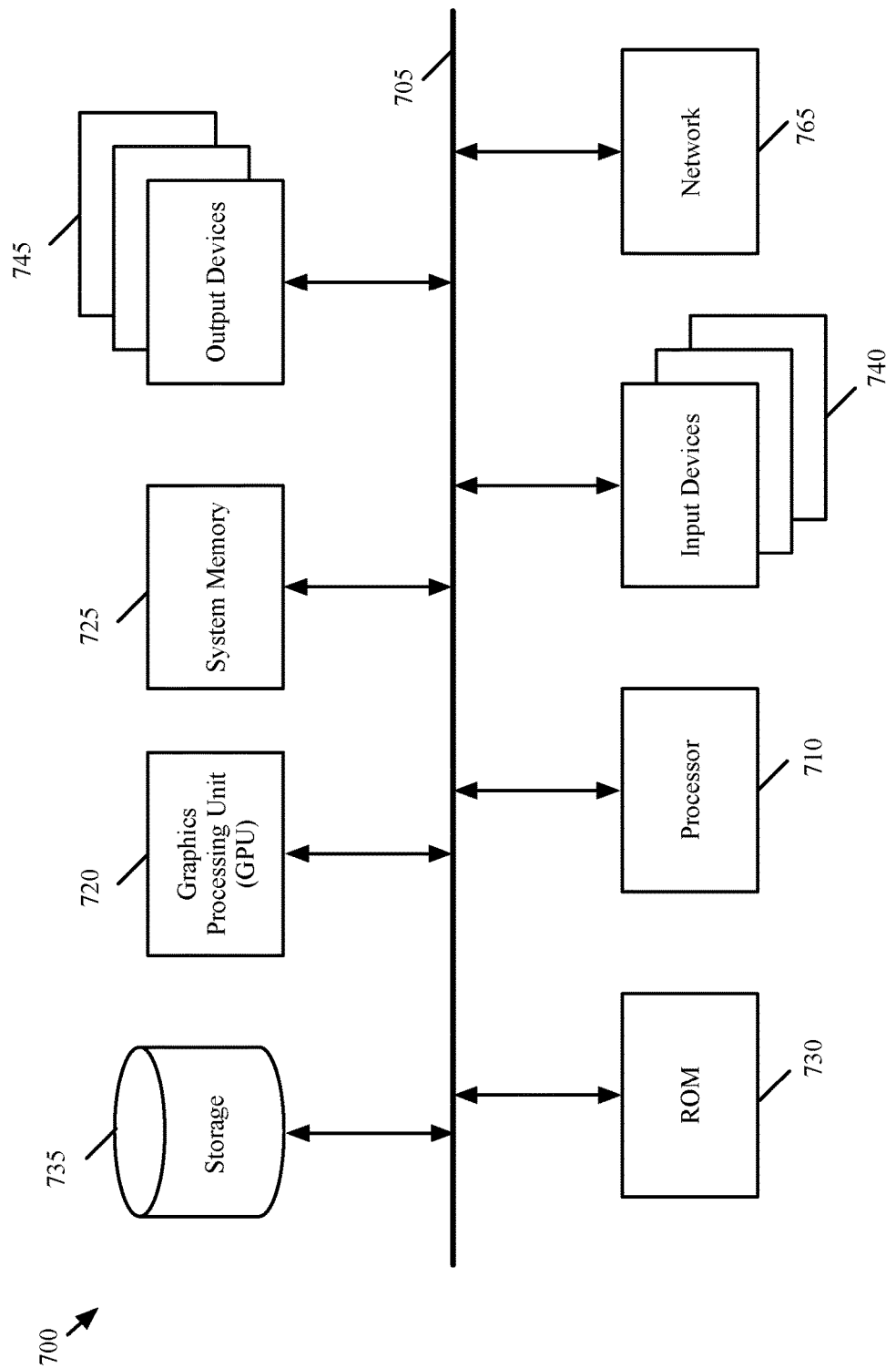
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash memory device, etc., and its corresponding drive) as the permanent storage device. Like the permanent storage device 735, the system memory 725 is a read-and-write memory device. However, unlike storage device 735, the system memory 725 is a volatile read-and-write memory, such a random access memory. The system memory 725 stores some of the instructions and data that the processor needs at runtime. In some embodiments, the invention's processes are stored in the system memory 725, the permanent storage device 735, and/or the read-only memory 730. From these various memory units, the processing unit(s) 710 retrieves instructions to execute and data to process in order to execute the processes of some embodiments.

The bus 705 also connects to the input and output devices 740 and 745. The input devices 740 enable the user to communicate information and select commands to the electronic system. The input devices 740 include alphanumeric keyboards and pointing devices (also called "cursor control devices"), cameras (e.g., webcams), microphones or similar devices for receiving voice commands, etc. The output devices 745 display images generated by the electronic system or otherwise output data. The output devices 745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 3 and 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for enabling a metadata proxy server to provide metadata proxy services for a plurality of logical networks, the method comprising:
   at a managed forwarding element (MFE) that executes on a same host computer as the metadata proxy server,
      receiving a first packet sent from a first data compute node (DCN) of a first logical network requesting metadata for the first DCN, said first packet comprising a particular layer four destination port number;
      receiving a second packet sent from a second DCN of a second logical network requesting metadata for the second DCN, said second packet comprising the same particular layer four destination port number;
      replacing (i) the particular destination port number in the first packet with a first port number that corresponds to a first port of the metadata proxy server that is associated with the first logical network and (ii) the particular destination port number in the second packet with a second different port number that corresponds to a second port of the metadata proxy server that is associated with the second logical network; and
      forwarding the first and second packets with their replaced port numbers to the metadata proxy server on the host computer for the metadata proxy server to provide metadata for the first DCN through the first port number and provide metadata for the second DCN through the second port number.

2. The method of claim 1, wherein the first DCN is logically coupled to a first logical switch in the first logical network and the second DCN is logically coupled to a second logical switch in the second logical network.

3. The method of claim 2, wherein the first logical switch is in a first subnet that has a first IP address range and the second logical switch is in a second, different subnet that has a second IP address range, wherein the first and second IP address ranges comprise one or more overlapping IP addresses.

4. The method of claim 3, wherein the metadata proxy server comprises (i) a first metadata proxy instance that listens to the first port to provide metadata proxy service for the first logical switch and (ii) a second metadata proxy instance that listens to the second port to provide metadata proxy service for the second logical switch.

5. The method of claim 1, wherein the metadata proxy server is a namespace operating on a physical host computer, said namespace comprising a plurality of ports and a plurality of metadata proxy instances, wherein each particular metadata proxy instance listens to a different particular port to provide metadata proxy service to a particular logical switch of a logical network.

6. The method of claim 1, wherein the first and second packets each further comprise a layer three destination address header that includes a same destination address in both packets.

7. The method of claim 6, wherein the layer three destination address and the particular layer four destination port number are associated with an address and a port number of the metadata proxy server.

8. The method of claim 1, wherein the requested metadata for the first DCN comprises at least one of a name and a description for the first DCN and the requested metadata for the second DCN comprises at least one of a name and a description for the second DCN.

9. The method of claim 1, wherein the requested metadata for the first DCN comprises at least one of an amount of virtual memory and a number of virtual processors that should be allocated to the first DCN and the requested metadata for the second DCN comprises at least one of a name and a description for the second DCN.

10. The method of claim 1 further comprising:
    creating a first flow entry for the first packet and a second flow entry for the second packet to establish a first data flow for the first request and a second data flow for the second request; and
    sending the requested metadata back to the first and second DCNs using the established first and second data flows.

11. The method of claim 1, wherein the metadata proxy server, based on the first port number from which the first packet is received, adds a first logical network identification data to the first packet and forwards the first packet to a metadata server that provides the requested metadata for the first DCN.

12. The method of claim 1, wherein the first and second logical networks are implemented by the MFE.

13. The method of claim 12, wherein the host computer on which the MFE executes is an edge node of a hosting system over network infrastructure of which the first and second logical networks are implemented.

14. A non-transitory machine readable medium storing a managed forwarding element (MFE) which when executed by at least one processing unit of a host computer enables a metadata proxy server to provide metadata proxy services for a plurality of logical networks, the MFE comprising sets of instructions for:
    receiving a first packet sent from a first data compute node (DCN) of a first logical network requesting metadata for the first DCN, said first packet comprising a particular layer four destination port number;
    receiving a second packet sent from a second DCN of a second logical network requesting metadata for the second DCN, said second packet comprising the same particular layer four destination port number;
    replacing (i) the particular destination port number in the first packet with a first port number that corresponds to a first port of the metadata proxy server that is associated with the first logical network and (ii) the particular destination port number in the second packet with a second different port number that corresponds to a second port of the metadata proxy server that is associated with the second logical network; and
    forwarding the first and second packets with their replaced port numbers to the metadata proxy server on the host computer for the metadata proxy server to provide metadata for the first DCN through the first port number and provide metadata for the second DCN through the second port number.

15. The non-transitory machine readable medium of claim 14, wherein the metadata proxy server comprises (i) a first metadata proxy instance that listens to the first port to provide metadata proxy services for the first logical network and (ii) a second metadata proxy instance that listens to the second port to provide metadata proxy services for the second logical network.

16. The non-transitory machine readable medium of claim 15, wherein the metadata proxy server comprises a plurality of other metadata proxy instances, each of which provides metadata proxy services to a plurality of DCNs associated with a particular logical network of the plurality of logical networks.

17. The non-transitory machine readable medium of claim 15, wherein the metadata proxy server is a namespace and each of the first and second proxy instances is a process of the namespace.

18. The non-transitory machine readable medium of claim 14, wherein the MFE further comprises sets of instructions for:

creating a first flow entry for the first packet and a second flow entry for the second packet to establish a first data flow for the first request and a second data flow for the second request; and sending the requested metadata back to the first and second DCNs using the established first and second data flows.

19. The non-transitory machine readable medium of claim 14, wherein the metadata proxy server, based on the first port number from which the first packet is received, adds a first logical network identification data to the first packet and forwards the first packet to a remote metadata server to receive the requested metadata for the first DCN.

20. The non-transitory machine readable medium of claim 14, wherein the requested metadata for the first DCN comprises at least one of a name for the first DCN, a description for the first DCN, an amount of virtual memory that should be allocated to the first DCN, and a number of virtual processors that should be allocated to the first DCN, wherein the requested metadata for the second DCN comprises at least one of a name for the second DCN, a description for the second DCN, an amount of virtual memory that should be allocated to the second DCN, and a number of virtual processors that should be allocated to the second DCN.

* * * * *